April 1, 1930.  C. H. ESTES  1,752,552
PIN PLATE FOR MOLDING FLASKS
Filed March 30, 1928
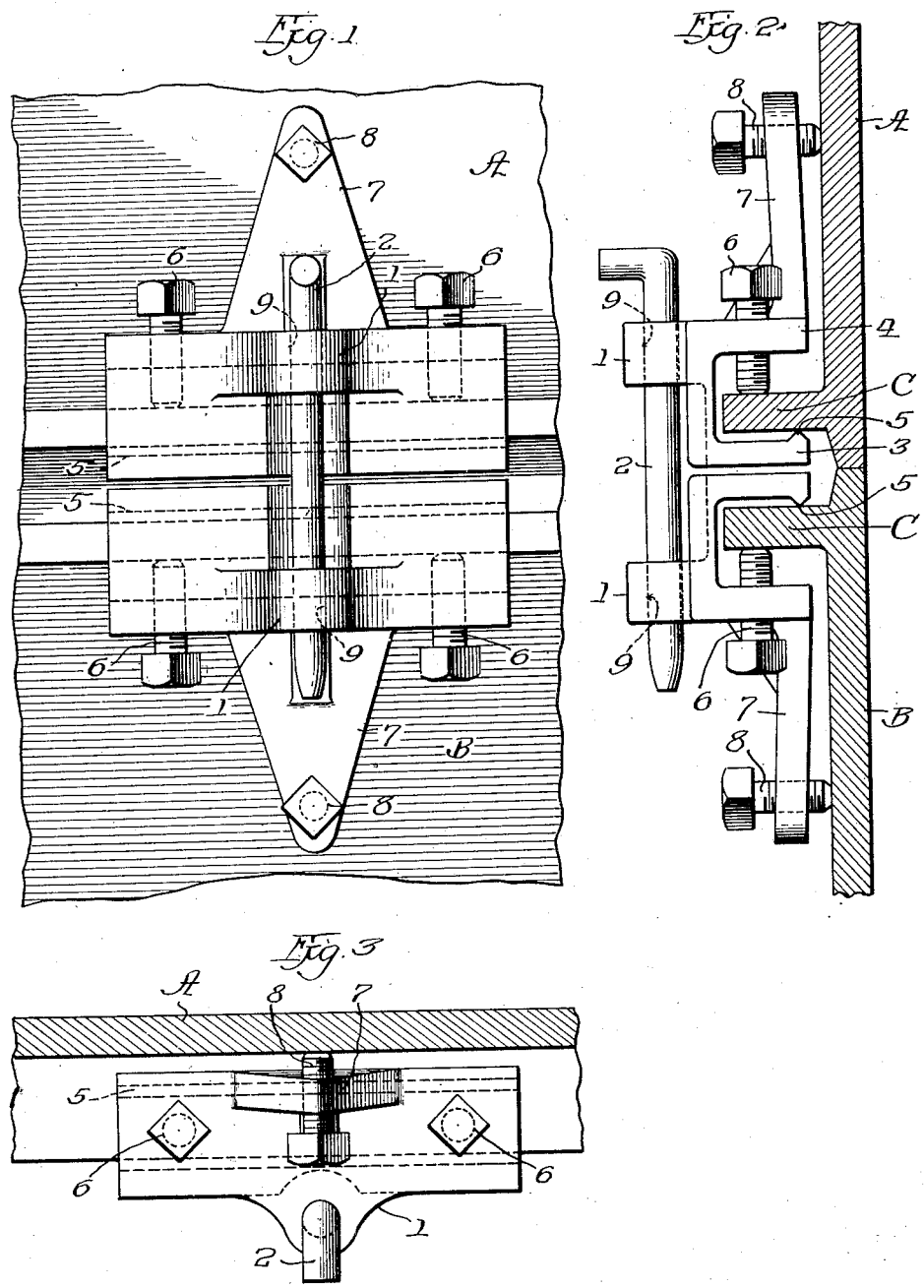
Inventor:
Clarence H. Estes,
By Wilkinson, Hudley, Byron & Knight
Attys.

Patented Apr. 1, 1930

1,752,552

UNITED STATES PATENT OFFICE

CLARENCE H. ESTES, OF CHICAGO HEIGHTS, ILLINOIS, ASSIGNOR TO AMERICAN MANGANESE STEEL COMPANY, OF CHICAGO, ILLINOIS, A CORPORATION OF MAINE

PIN PLATE FOR MOLDING FLASKS

Application filed March 30, 1928. Serial No. 265,857.

This invention relates to the means for holding together the cope and drag sections of a molding flask during the process of making the casting, and particularly to means, for this purpose, which are readily applied to and removed from the flasks so that they will not be subjected to abuse and destruction by the unavoidably rough handling of the flasks.

The object of the invention is to provide pin plates for the purpose stated which will be very secure and accurate in serving their intended purpose, and readily applied to conventional forms of flasks notwithstanding the roughness of surfaces frequently encountered in flasks; and the invention proceeds upon the principle of providing pin plates for the respective flasks with gripping jaws entering into bearing against the connecting flanges of the flasks through means of restricted bearing edges and screws, so that the plates can be accurately located in parallelism and with their pin holes in alignment notwithstanding unevenness in the surfaces to be gripped by the jaws, and providing the pin plates with stabilizing lugs or brackets carrying bearing screws sufficiently offset, by the length of the lug or bracket, from the bearing edges of the jaws to adjust the plates to desired positions and hold them in such positions.

In the accompanying drawing—

Figures 1, 2, and 3 represent in front elevation, side elevation, and top plan view, respectively, a pair of pin plates embodying the subject-matter of the invention, together with portions of two flasks which the plates hold in registry as in the process of casting.

A represents a portion of the cope and B a portion of the drag flask of a mold. These flasks are conventionally made with flanges C through means of which the flasks may be held in proper registry during the process of molding, to which end, said flanges have generally been designed with special reference to means for holding them against relative displacement, such, for instance, as ears or lugs having aligned openings to receive so-called flask pins, but in the rough handling which flasks unavoidably receive in the foundry, such aligning or registry means quickly become broken. The present invention substitutes for the integral pin receiving ears or lugs, pin plates 1 having holes suitable for the reception of a flask pin 2, and provides for ready attachment of these pin plates to and their detachment from the flasks by constructing them with inner and outer jaws 3 and 4 adapted to enter into bearing at opposite sides of the flanges C; the inner jaw 3 being designed with a bearing portion 5, for instance, a sharp ridge that is adapted to not only find a firm seating upon the flange but one which will permit the plate to tip upon the flange; and the jaw 4 carrying a set screw 6 bearing upon the other side of the flange, preferably in a plane horizontally offset from the bearing point of the lip 5. Each pin plate is further provided with a lug or bracket 7 projecting from the side thereof which is remote from the flange C and carrying at its end a set screw 8 that is adapted to bear against the flask in a direction to tend to tip the plate on the flange and cause the lip 5 and set screw 6 to grip more firmly; also to more firmly fix the plates in parallelism. Each plate 1 has a pin hole 9 which is brought into alignment with the corresponding hole in a mating pin plate by the proper adjustment of the plates upon the flanges C, and these pin holes, when so aligned, are adapted to receive a flask pin 2 of known construction and design.

A pin plate constructed as above described is very conveniently brought into firm gripping relation to the flange of a flask by applying the plate in substantially horizontal position, adjusting the screw 6 until the lip 5 is brought into bearing, and then adjusting the screw 8 to slightly tip the plate about a point intermediate of the lip 5 and the screw 6, by which tipping a turning moment on each of the members 5 and 6 develops so as to increase the gripping effect and cause the sharp lip 5 to embed itself slightly, so that with the assistance of the frictional impingement of the screw 6 the plate is firmly held against displacement.

I claim:

1. A separately formed pin plate for application to a molding flask, said pin plate being constructed with jaws providing between them a receiving space for a portion of a flask upon which the pin plate is to be mounted, and with a tipping bracket extending from said jaws in position to coact with another portion of the flask when the pin plate is applied; said bracket being provided with means for developing a tipping moment of the jaws relatively to the portion of the flask occupying the receiving space.

2. A pin plate as described in claim 1, in which the jaws carry means through which they impinge against the inserted portion of the flask; the last-named means being offset in the plane of the receiving space and being caused by such offset to increase the grip upon the inserted portion by the tipping action in one direction, and to release their grip upon the inserted portion by tipping action in the opposite direction.

3. A pin plate as described in claim 1, in which the gripping jaws have means through which they impinge against the portion of a flask occupying the receiving space; one of said impinging means being adjustable; and the other impinging means being offset in the plane of the receiving space whereby adjustment of the adjustable impinging means changes the angle of the pin plate relatively to the flask.

4. A pin plate as described in claim 1, including in its construction a pin-receiving lug extending in a plane parallel with the plane of the receiving space; said lug being provided with a pin hole transverse to said plane; and having the tipping bracket extend in a plane perpendicular to the plane of the receiving space.

5. A pin plate for mold flasks, comprising a pair of substantially parallel jaws providing between them a receiving space, impinging means, of which one is adjustable, presented in said receiving space transversely to the plane of said jaws and offset one relatively to the other in the direction in which the jaws extend, whereby tipping of the pin plate causes said impinging means to grip a portion of a flask occupying said space, and while tipping in the opposite direction releases the grip of said impinging means of the inserted portion, and a tipping bracket extending rigidly from one of said jaws and carrying an impinging means presented in a direction to cause by its impingement against the flask, tipping of the pin plate in the direction to cause the impinging means of the jaws to grip the inserted portion of the flask.

Signed at Chicago Heights, Illinois, this 19 day of March, 1928.

C. H. ESTES.